United States Patent
Chopra et al.

(10) Patent No.: US 11,593,497 B2
(45) Date of Patent: Feb. 28, 2023

(54) SYSTEM AND METHOD FOR MANAGING SENSITIVE DATA

(71) Applicant: EMC IP Holding Company LLC, Hopkinton, MA (US)

(72) Inventors: Shelesh Chopra, Bangalore (IN); Manish Sharma, Bangalore (IN); Aaditya Rakesh Bansal, Bangalore (IN); Sunil Yadav, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 548 days.

(21) Appl. No.: 16/669,444

(22) Filed: Oct. 30, 2019

(65) Prior Publication Data

US 2021/0133338 A1    May 6, 2021

(51) Int. Cl.
*G06F 21/62*    (2013.01)
*G06F 11/14*    (2006.01)

(52) U.S. Cl.
CPC ...... *G06F 21/6218* (2013.01); *G06F 11/1453* (2013.01); *G06F 2201/84* (2013.01)

(58) Field of Classification Search
CPC ............. G06F 21/6218; G06F 11/1453; G06F 2201/84
See application file for complete search history.

(56) References Cited

U.S. PATENT DOCUMENTS

| | | | |
|---|---|---|---|
| 6,408,336 B1* | 6/2002 | Schneider | H04L 63/0263 726/4 |
| 8,554,918 B1 | 10/2013 | Douglis | |
| 8,812,455 B1* | 8/2014 | Claudatos | G06F 16/122 707/664 |
| 9,298,707 B1* | 3/2016 | Zhang | G06F 11/1453 |
| 9,430,332 B1* | 8/2016 | Bahadure | G06F 16/27 |
| 9,772,791 B2* | 9/2017 | Resch | G06F 3/0643 |
| 9,977,704 B1 | 5/2018 | Chopra et al. | |
| 10,102,083 B1* | 10/2018 | Dobrean | G06F 16/113 |
| 10,320,757 B1 | 6/2019 | Secker-walker | |
| 10,417,213 B1 | 9/2019 | Mukku et al. | |
| 10,489,066 B1 | 11/2019 | Krinke | |
| 10,572,350 B1 | 2/2020 | Bansal et al. | |
| 10,642,698 B1 | 5/2020 | Chopra et al. | |
| 11,265,148 B1 | 3/2022 | Griffin et al. | |
| 11,297,459 B2* | 4/2022 | Raduchel | H04W 4/02 |
| 2008/0086609 A1* | 4/2008 | Lesser | G06F 11/1458 711/E12.103 |
| 2010/0058114 A1 | 3/2010 | Perkins et al. | |
| 2010/0250497 A1* | 9/2010 | Redlich | H04L 63/105 707/661 |

(Continued)

*Primary Examiner* — Jason Chiang
(74) *Attorney, Agent, or Firm* — Chamberlain, Hrdlicka, White, Williams & Aughtry

(57) ABSTRACT

A backup manager for providing backup services includes persistent storage and a backup orchestrator. The persistent storage includes protection policies. The backup orchestrator generates a backup for a client based on the protection policies. The backup orchestrator generates an index for the backup. The index specifies a sensitivity level of each portion of the backup. The backup orchestrator stores portions of the backup in regions of a container that correspond to the sensitivity level of the respective portion of the backup. The backup orchestrator stores the container in backup storage.

11 Claims, 10 Drawing Sheets

(56) References Cited

U.S. PATENT DOCUMENTS

| | | | |
|---|---|---|---|
| 2011/0113012 A1* | 5/2011 | Gruhl | G06F 11/1451 |
| | | | 707/646 |
| 2011/0131185 A1 | 6/2011 | Kirshenbaum | |
| 2011/0213928 A1 | 9/2011 | Grube et al. | |
| 2013/0091536 A1 | 4/2013 | Manjunath | |
| 2014/0115029 A1* | 4/2014 | Baldwin | H04L 63/0428 |
| | | | 709/203 |
| 2014/0136832 A1* | 5/2014 | Klum | H04L 67/1097 |
| | | | 713/150 |
| 2014/0310800 A1 | 10/2014 | Kabra et al. | |
| 2014/0351632 A1 | 11/2014 | Grube et al. | |
| 2015/0046192 A1* | 2/2015 | Raduchel | G16H 10/65 |
| | | | 705/3 |
| 2015/0066865 A1 | 3/2015 | Yara | |
| 2015/0066866 A1 | 3/2015 | Yara | |
| 2015/0169898 A1* | 6/2015 | Lembcke | G06F 21/6245 |
| | | | 726/28 |
| 2015/0242648 A1 | 8/2015 | Lemmey | |
| 2016/0034133 A1* | 2/2016 | Wilson | G06F 3/0488 |
| | | | 715/772 |
| 2016/0132521 A1 | 5/2016 | Reininger | |
| 2016/0179416 A1 | 6/2016 | Mutha et al. | |
| 2016/0274978 A1* | 9/2016 | Strohmenger | G05B 19/0426 |
| 2016/0357971 A1* | 12/2016 | Sinha | H04L 63/10 |
| 2016/0371500 A1* | 12/2016 | Huang | G06F 21/6218 |
| 2017/0371547 A1 | 12/2017 | Fruchtman et al. | |
| 2018/0032446 A1 | 2/2018 | Amarendran et al. | |
| 2018/0067848 A1 | 3/2018 | Baldwin | |
| 2018/0089044 A1* | 3/2018 | Guim Bernat | G06F 12/1483 |
| 2018/0157860 A1 | 6/2018 | Nair et al. | |
| 2018/0159729 A1 | 6/2018 | Deshmukh et al. | |
| 2018/0225177 A1 | 8/2018 | Bhagi et al. | |
| 2018/0232528 A1* | 8/2018 | Williamson | G06N 20/00 |
| 2019/0057101 A1 | 2/2019 | Esserlieu et al. | |
| 2019/0158596 A1* | 5/2019 | McShane | H04L 67/1097 |
| 2019/0205056 A1 | 7/2019 | Halstuch | |
| 2019/0312910 A1* | 10/2019 | Convertino | G06F 16/254 |
| 2019/0332683 A1 | 10/2019 | Thummala et al. | |
| 2019/0354708 A1 | 11/2019 | Fisher et al. | |
| 2020/0012431 A1 | 1/2020 | Chopra et al. | |
| 2020/0233975 A1 | 7/2020 | Rosenthol et al. | |
| 2020/0241908 A1 | 7/2020 | Dornemann et al. | |
| 2020/0241975 A1 | 7/2020 | Basham et al. | |
| 2020/0285771 A1 | 9/2020 | Dey et al. | |
| 2020/0301882 A1 | 9/2020 | Pogde et al. | |
| 2020/0302082 A1* | 9/2020 | Carteri | G06F 21/6245 |
| 2020/0320208 A1* | 10/2020 | Bhosale | G06N 3/08 |
| 2021/0034571 A1 | 2/2021 | Bedadala et al. | |
| 2021/0035089 A1* | 2/2021 | Johnston | G06Q 20/363 |
| 2021/0117277 A1 | 4/2021 | Shetty et al. | |
| 2021/0133040 A1* | 5/2021 | Bansal | G06F 11/1435 |
| 2021/0133248 A1* | 5/2021 | Sharma | G06F 11/1458 |

\* cited by examiner

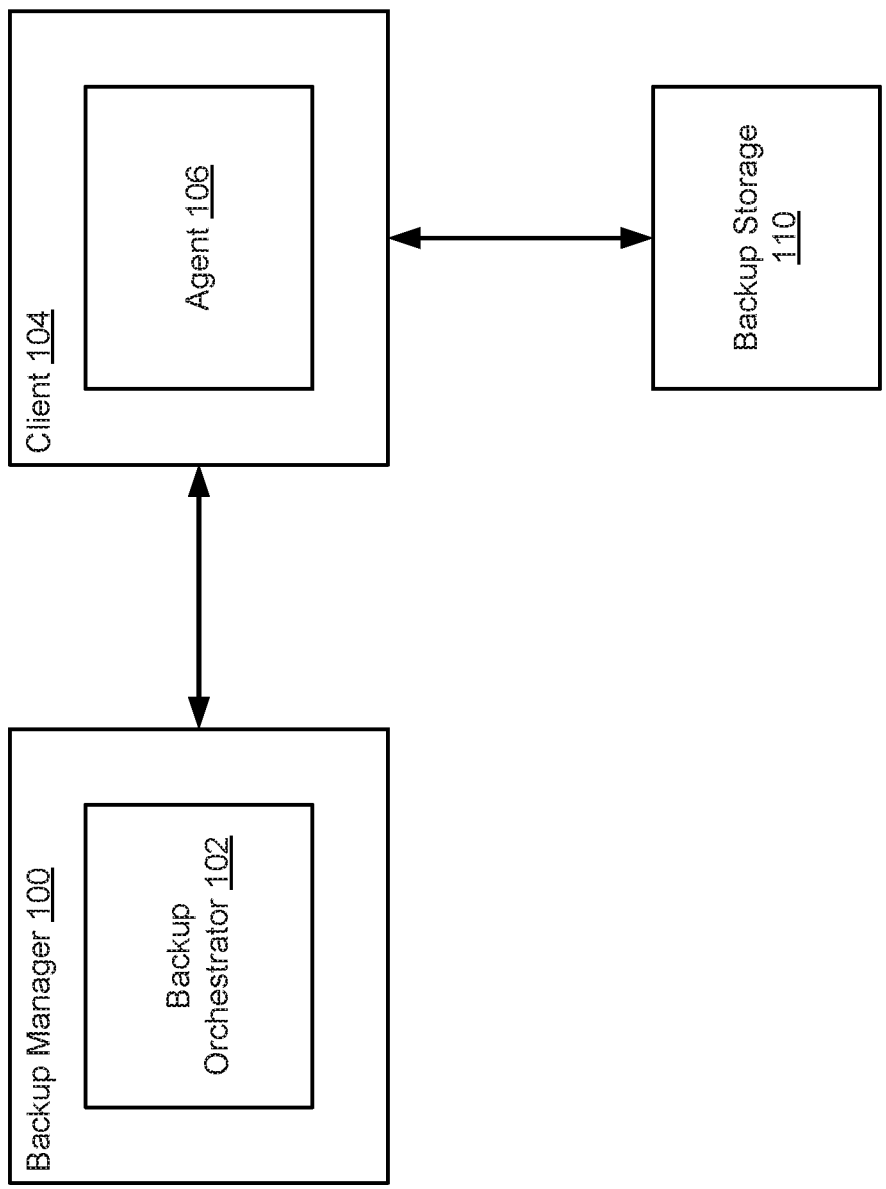
FIG. 1.1

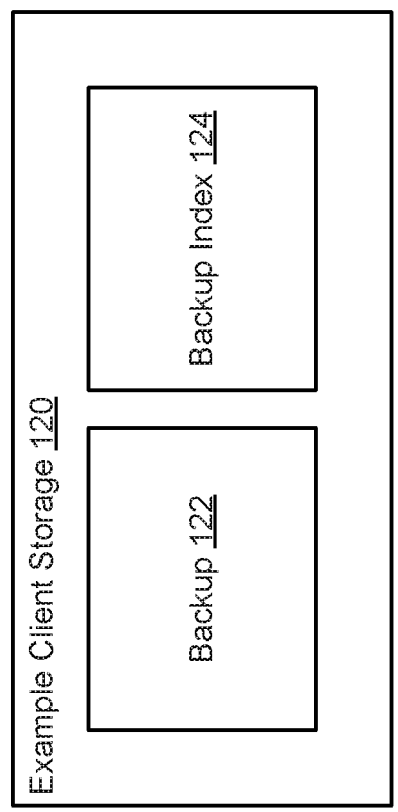
FIG. 1.2

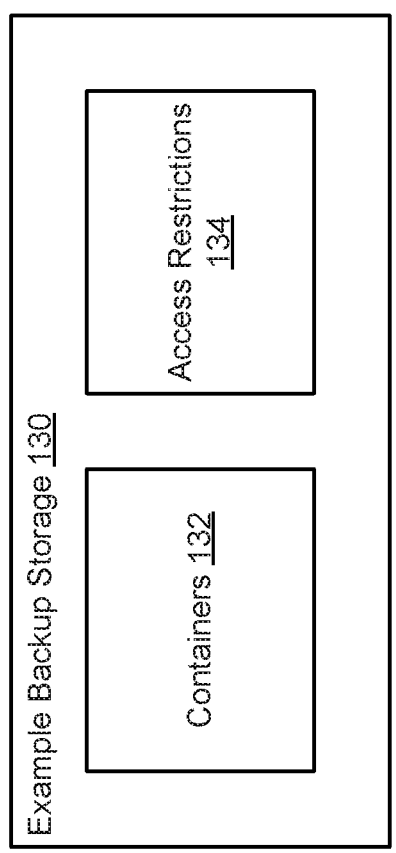
FIG. 1.3

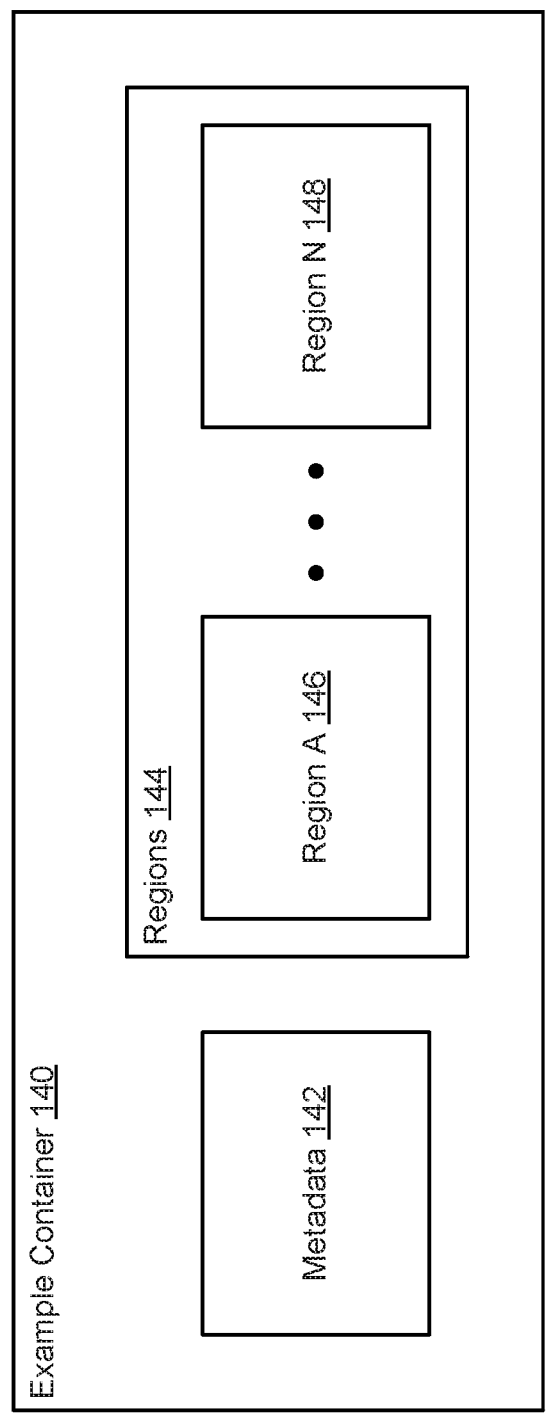
FIG. 1.4

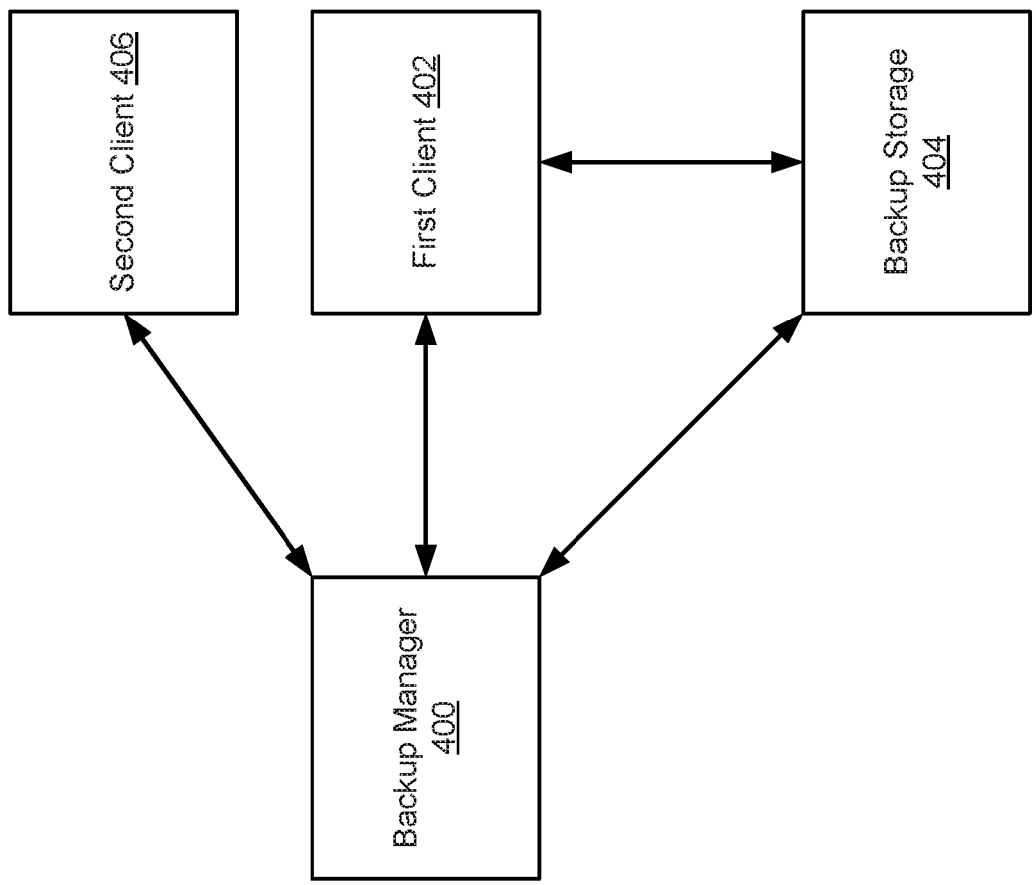
FIG. 4.1

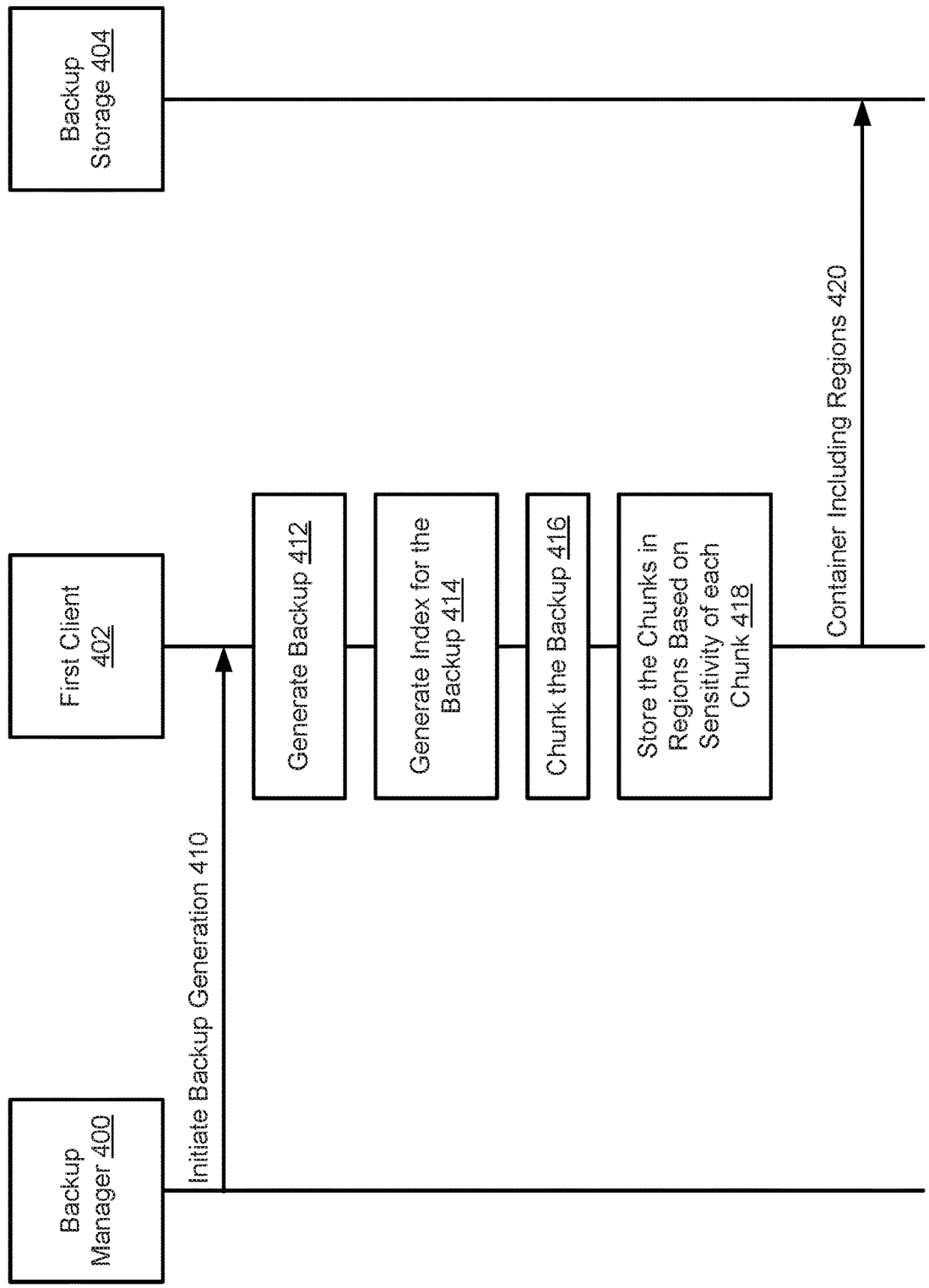
FIG. 4.2

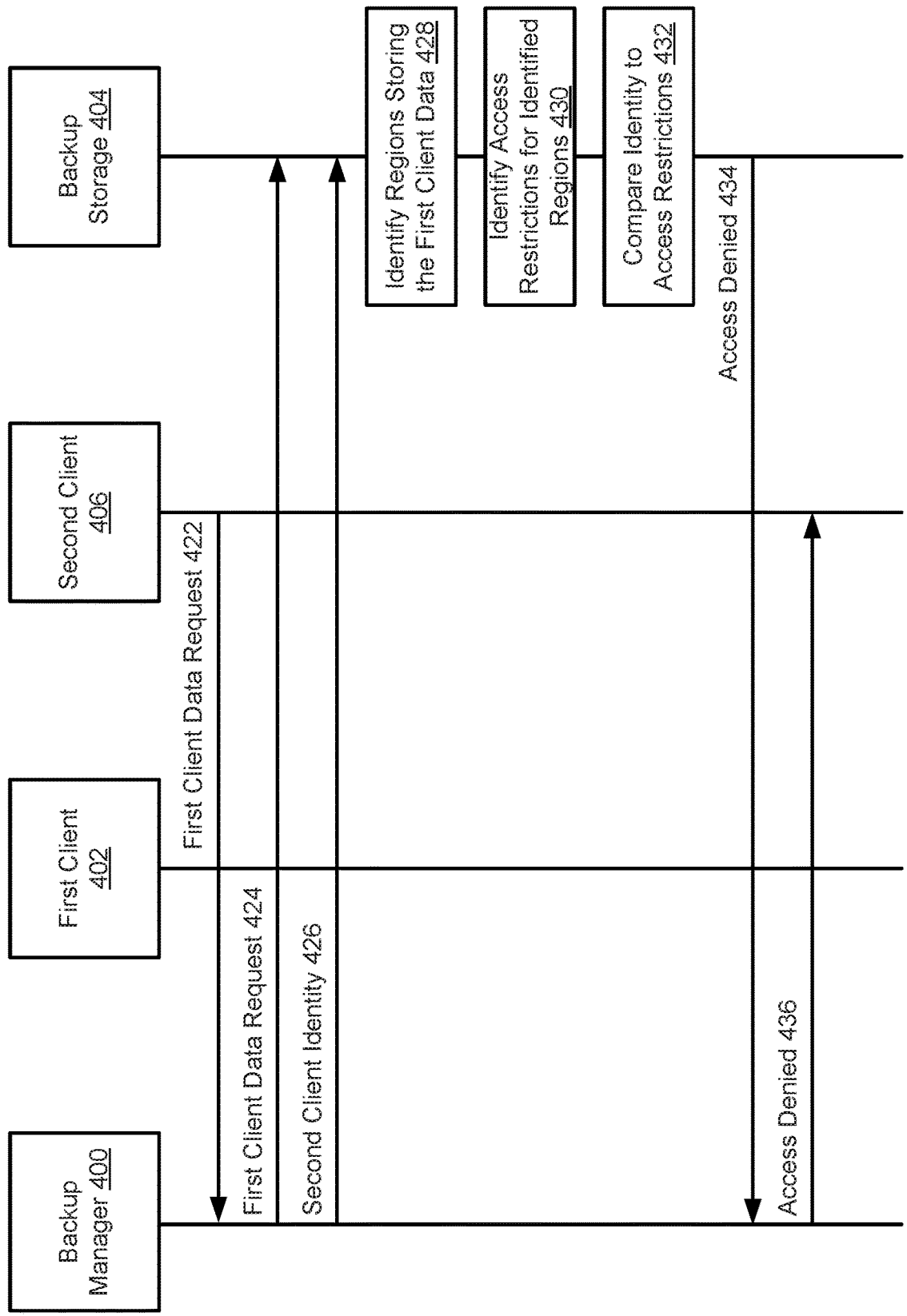
FIG. 4.3

SYSTEM AND METHOD FOR MANAGING SENSITIVE DATA

BACKGROUND

Devices may generate information based on existing information. For example, devices may obtain information and derive information based on the obtained information. To obtain information, devices may be able to communicate with other devices. The communications between the devices may be through any means.

SUMMARY

In one aspect, a backup manager for providing backup services in accordance with one or more embodiments of the invention includes persistent storage and a backup orchestrator. The persistent storage includes protection policies. The backup orchestrator generates a backup for a client based on the protection policies; generates an index for the backup, the index specifies a sensitivity level of each portion of the backup; stores portions of the backup in regions of a container that correspond to the sensitivity level of the respective portion of the backup; and stores the container in backup storage.

In one aspect, a method for providing backup services in accordance with one or more embodiments of the invention includes generating a backup for a client based on a protection policy associated with the client; generating an index for the backup, the index specifies a sensitivity level of each portion of the backup; storing portions of the backup in regions of a container that correspond to the sensitivity level of the respective portion of the backup; and storing the container in backup storage.

In one aspect, a non-transitory computer readable medium in accordance with one or more embodiments of the invention includes computer readable program code, which when executed by a computer processor enables the computer processor to perform a method for providing backup services. The method includes generating a backup for a client based on a protection policy associated with the client; generating an index for the backup, the index specifies a sensitivity level of each portion of the backup; storing portions of the backup in regions of a container that correspond to the sensitivity level of the respective portion of the backup; and storing the container in backup storage.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an example client storage in accordance with one or more embodiments of the invention.

FIG. 1.3 shows a diagram of an example backup storage in accordance with one or more embodiments of the invention.

FIG. 1.4 shows a diagram of an example container in accordance with one or more embodiments of the invention.

FIG. 4.1 shows a diagram of an example system.

FIGS. 4.2-4.3 show diagrams of interactions between and actions performed by components of the example system of FIG. 4.1 over time.

DETAILED DESCRIPTION

Figure 2:
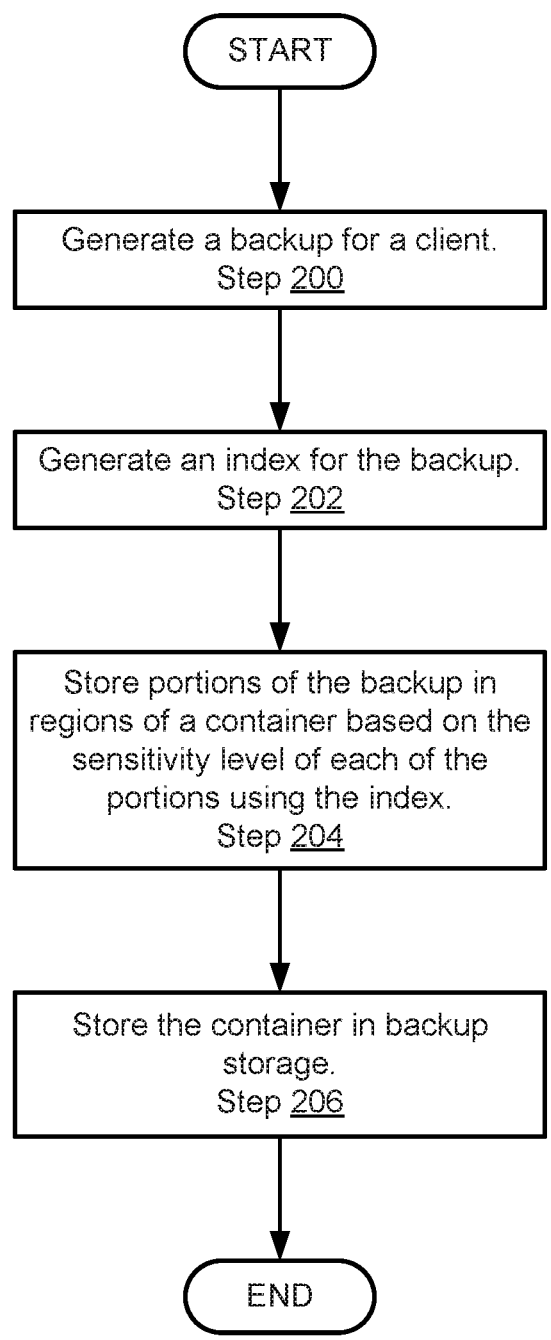
FIG. 2 shows a flowchart of a first method of providing backup services in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for providing backup services to clients or other types of devices. Backup services may include generating backups of the clients, storing the backups, using the backups to restore clients to previous states, and enabling the contents of the backups to be provided.

Embodiments of the invention may further provide a method for storing the backups in a format that enables access controls for various portions of the backups to be implemented. The access controls may restrict access to the respective portions of the backups based on a sensitivity level of each of the respective portions.

To enable access controls to be employed, the backups may be chunked into any number of data chunks, the sensitivity level of each of the chunks identified, and the chunks may be grouped based on the sensitivity level of each of the chunks. The groups of chunks may be stored in different regions of a container that employs access controls on a region level. By doing so, the computational resource efficiency of storing backups in containers may be retained while enabling different portions of backups have different sensitivity levels to be provided with granularly defined access controls.

FIG. 1.1 shows a system in accordance with one or more embodiments of the invention. The system may include a client (104) that utilizes backup services provided by the backup manager (100), an agent (106) hosted by the client (104) that coordinates with the backup manager (100) to provide backup services, and/or a backup storage (110) that stores generated backups for future use. The backup manager (100) may include a backup orchestrator (102) that cooperates with the agent (106) to orchestrate generation and storage of backups. The backup services provided by the backup manager (100) may include (i) generation of backups of the client (104), (ii) storing the backups in a backup storage (110), (iii) utilizing backups of the client (104) stored in the backup storage (110) to restore the client (104) and/or provide data included in the stored backups, and/or (iv) limiting access to different portions of data in backup storage based on a sensitivity level of the respective portion of data.

For example, backups of the client (104) may be data structures that include data reflecting the state of the client (104) at a point of time (e.g., a full backup) and/or changes in the state of the client (104) over a period of time (e.g., an incremental backup). Different portions of the backup may correspond with different portions of the client's (104) data (e.g., files of a file system is used to organize the client's data or other types of data structures that may be employed by other types of data organization systems) at the point/period of time.

The backups may be used to change the data of the client (104) to reflect the data at points/periods of time associated with backups. Once changed, the state of the client (104) may be similar to the state of the client when the backups were generated. Thus, the backups may be used to restore the operational state of the client (104) to previous operational states. The aforementioned functionality may be desirable, for example, to respond to scenarios in which the client (104) becomes inoperable due to data corruption, hardware issues that prevent the client (104) from operating, and/or for other reasons.

The backups may be stored in backup storage for future use. To store the backups in an efficient manner, the system of FIG. 1.1 may store the data of the backups in containers. A container may be a data structure that includes data in a format that is not self-describing. Consequently, more data may be stored in a container when compared to other types of data structures that may be used to store data that are self-describing.

When the client (104) generates data, the generated data may include information of varying levels of sensitivity. Consequently, backups of the client (104) may also include data of varying levels of sensitivity. The sensitivity level of data may reflect the level of consequence of the data being inadvertently disclosed to any entity other than the owner of the data. For example, data that includes names of customers and/or payment information may be of a higher level of sensitivity than data including music preferences of a person.

When the client (104) generates data, the client (104) may store metadata regarding various portions of the generated data. The metadata may specify characteristics of the portions of the generated data such as, for example, the name of the portion, a creation time, contents of the portion of the data, etc. The information included in the metadata may be used to identify a sensitivity level of the associated portion of data.

Embodiments of the invention may provide a method of storing data in a container that reduces the likelihood of inadvertent disclosure of data stored in backup storage to entities that are not authorized to access the data. Specifically, embodiments of the invention may provide a method for segregating data of different levels of sensitivity within containers stored in backup storage. Segregating the data may enable access controls to be applied at a container level to prevent inadvertent disclosure of data to unauthorized entities. By doing so, embodiments of the invention may provide a distributed system that is able to manage data in a manner that is less likely to result in disclosure of sensitive information to unauthorized parties.

Each of the components of the system of FIG. 1.1 may be operably connected to each other and/or other entities not shown using any combination and quantity of wired and/or wireless networks. Each component of the system is discussed below.

The client (104) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform all, or a portion, of the functions described in this application and/or all, or a portion, of the methods illustrated in FIGS. 2-3. The client (104) may be implemented using other types of computing devices without departing from the invention. For additional details regarding computing devices, refer to FIG. 5.

The client (104) may be implemented using logical devices without departing from the invention. For example, the client (104) may be implemented using virtual machines that utilize computing resources of any number of physical computing devices to provide the functionality of the client (104). The client (104) may be implemented using other types of logical devices without departing from the invention.

In one or more embodiments of the invention, the client (104) provides computer implemented services. A computer implemented service may be, for example, managing a database, serving files, and/or providing other types of services that may be utilized by users. The computing implemented services may be other types of services without departing from the invention.

When providing computer implemented services, the client (104) may generate and store data which the client (104) utilizes to provide the computer implemented services. For example, to provide database services, the client (104) may store information from a user in a database. The user may desire access to the information in the future. Consequently, the future availability of the data stored in the data may be valuable to the client (104).

Similarly, other entities may desire access to all, or a portion, of the client's data at future points in time. For example, other entities may desire to obtain access to information included in a database hosted by the client (104).

To improve the likelihood that such data is available in the future, the client (104) may utilize backup services provided by the backup manager (100). As discussed above, the backup services provided by the backup manager (100) may include orchestration of backup generation, storage of backups in the backup storage (110), and/or providing access to backups and/or information included in the backups (e.g., particular files).

To assist the backup manager (100) in providing backup services, the client (104) may host an agent (106). The agent (106) may orchestrate generation of backups of the client (104). To do so, the agent (106) may invoke functionality of the client (104) to generate the backup. For example, the agent (106) may invoke the functionality of the client (104) to cause the client (104) to enter a consistent state (e.g., flush buffers or other in-memory data structures) and generate a backup of all, or a portion, of the client data. Once generated, the agent (106) may generate a backup index for the generated backup. The backup index may reflect the content (e.g., different logical portions of the backup such as files) of the backup.

To generate the backup index, the agent (106) may utilize system metadata (or other types of metadata used to organize/describe logical portions of the client's data included in the backup) stored in the backup to generate the backup index. For additional details regarding backups and backup indexes, refer to FIGS. 1.2-1.4.

The agent (106) may be implemented using a logical entity. For example, the agent (106) may be implemented using computer instructions stored in persistent storage that when executed by a processor of the client gives rise to the agent (106). The agent (106) may be implemented using a physical device. For example, the agent (106) may be implemented using an integrated circuit having circuitry adapted to provide the functionality of the agent (106). The circuitry may be adapted to provide the functionality of the agent (106) by including different portions of circuitry that provide different portions of the functionality of the agent (106).

Figure 3:
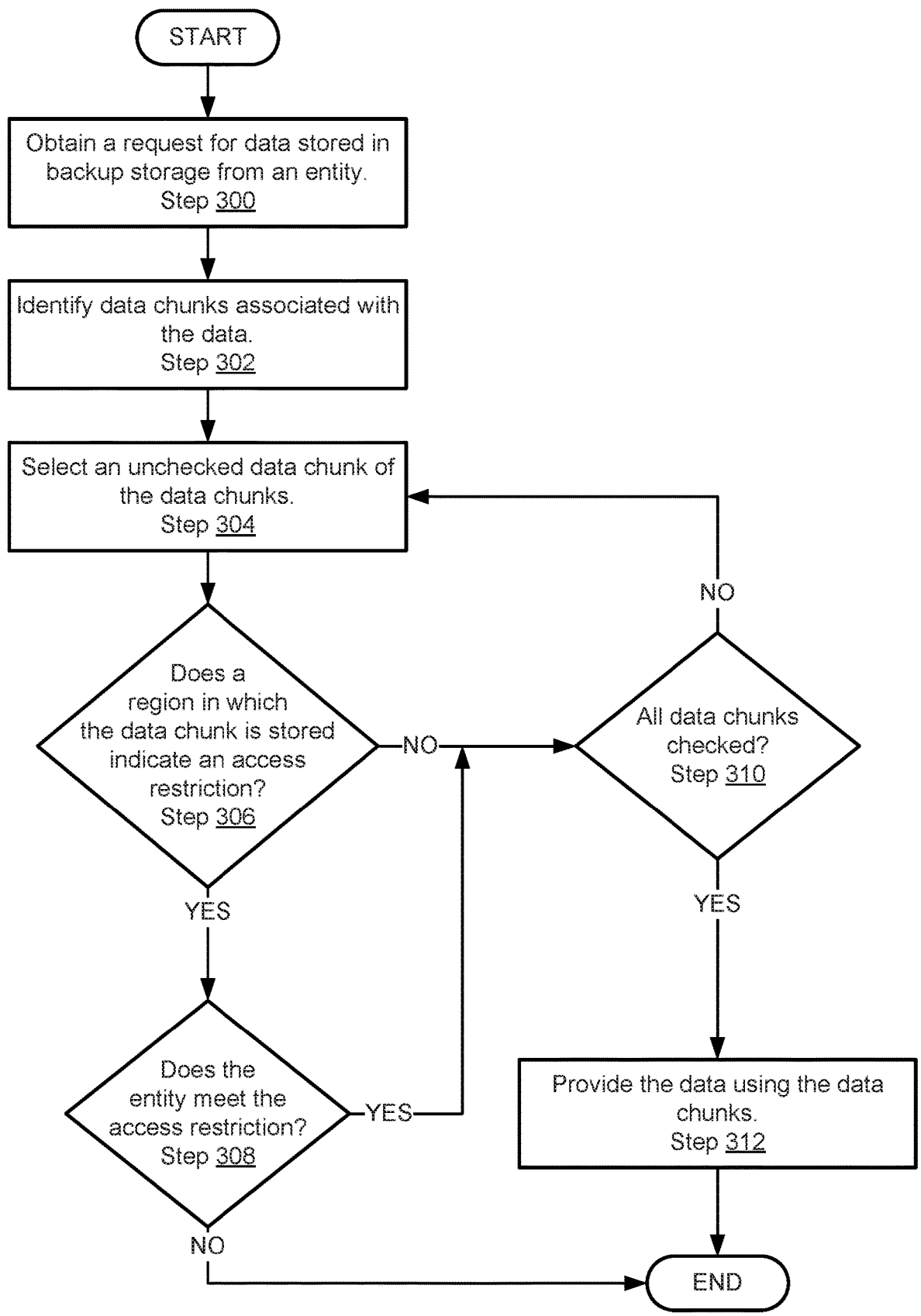
FIG. 3 shows a flowchart of a second method of providing backup services in accordance with one or more embodiments of the invention.

When providing its functionality, the agent (106) may perform all, or a portion, of the methods illustrated in FIGS. 2-3.

While the client (104) is illustrated in FIG. 1.1 as including an agent (106), the client (104) may include additional, fewer, and/or different components from those discussed above without departing from the invention.

The backup manager (100) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform all, or a portion, of the functions described in this application and/or all, or a portion, of the methods illustrated in FIGS. 2-3. The backup manager (100) may be implemented using other types of computing devices without departing from the invention. For additional details regarding computing devices, refer to FIG. 5.

The backup manager (100) may be implemented using logical devices without departing from the invention. For example, the backup manager (100) may be implemented using virtual machines that utilize computing resources of any number of physical computing devices to provide the functionality of the backup manager (100). The backup manager (100) may be implemented using other types of logical devices without departing from the invention.

In one or more embodiments of the invention, the backup manager (100) provides backup services to the client (104) and/or other entities. Providing backup services may include (i) orchestrating generation of backups of the client (104), (ii) orchestrating storage of the backups in the backup storage (110), (iii) providing data from the backups stored in the backup storage (110), and/or (iv) orchestrating restoration of the client (104) using the backups stored in the backup storage (110).

When generating backups, the backup manager (100) may generate backups based on protection policies that specify when and how backups for entities are to be generated. For example, a protection policy associated with the client (104) may specify when different types (e.g., full/incremental) of backups are to be generated for the client (104). A protection policy may be implemented using a data structure stored in storage that specifies when and how backups are to be generated.

To provide its functionality, the backup manager (100) may include a backup orchestrator (102) that provides the above noted functionality of the backup manager (100) and/or includes functionality to send messages to entities (e.g., an agent (106)) hosted by the client (104) to invoke functionality of the entities (e.g., agent (106)). For example, the agent (106) hosted by the client (104) may service requests from the backup manager (100). The agent (106) may, upon receipt of such requests, invoke functionality of the client (104) and/or its own functionality to service the requests from the backup manager (100).

The backup storage (110) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform all, or a portion, of the functions described in this application and/or all, or a portion, of the methods illustrated in FIGS. 2-3. The backup storage (110) may be implemented using other types of computing devices without departing from the invention. For additional details regarding computing devices, refer to FIG. 5.

The backup storage (110) may be implemented using logical devices without departing from the invention. For example, the backup storage (110) may be implemented using virtual machines that utilize computing resources of any number of physical computing devices to provide the functionality of the backup storage (110). The backup storage (110) may be implemented using other types of logical devices without departing from the invention.

In one or more embodiments of the invention, the backup storage (110) provides data storage services to the client (104) and/or other entities. Data storage services may include storing data and providing copies of previously stored data. For example, backups of the client (104) and/or other entities may be stored in the backup storage (110) for storage.

The data stored in the backup storage (110) may include backups of the client (104) and/or backup indexes associated with the backups. The backup storage (110) may store multiple backups of multiple types that may be used in isolation or in combination with other backups to restore corresponding entities to previous operating states. Copies of the backup indexes may also be stored in the backup manager (100).

While the system of FIG. 1.1 has been illustrated as including a limited number of specific components, a system in accordance with embodiments of the invention may include additional, fewer, and/or different components without departing from the invention. For example, the system may include any number of clients (e.g., 104), backup managers (e.g., 100) that provide backup services to all or a portion of the clients, backup storages (110) that provide backup services to any number of entities, and/or other entities without departing from the invention. Any of the aforementioned components may cooperate to provide the above noted and later described functionality of the system of FIG. 1.1.

As discussed above, the client (104) may generate backups and backup indexes as part of the process of backing up the client's (104) data. To further clarify aspects of backups and backup index, a diagram of an example storage of the client (104) is illustrated in FIG. 1.2.

In one or more embodiments of the invention, the example client storage (120) is implemented using devices that provide data storage services (e.g., storing data and providing copies of previously stored data). The devices that provide data storage services may include hardware devices and/or logical devices. For example, the example client storage (120) may include any quantity and/or combination of memory devices (i.e., volatile storage), long term storage devices (i.e., persistent storage), other types of hardware devices that may provide short term and/or long-term data storage services, and/or logical storage devices (e.g., virtual persistent storage/virtual volatile storage).

For example, the example client storage (120) may include a memory device (e.g., a dual in line memory device) in which data is stored and from which copies of previously stored data are provided. In another example, the example client storage (120) may include a persistent storage device (e.g., a solid state disk drive) in which data is stored and from which copies of previously stored data is provided. In a still further example, the example client storage (120) may include a memory device (e.g., a dual in line memory device) in which data is stored and from which copies of previously stored data is provided and a persistent storage device that stores a copy of the data stored in the memory device (e.g., to provide a copy of the data in the event that power loss or other issues with the memory device that may impact its ability to maintain the copy of the data cause the memory device to lose the data).

The example client storage (120) may store data structures including a backup (122) and a backup index (124). Each of these data structures is discussed below.

The backup (122) may be a data structure that includes information regarding the state of the client (104, FIG. 1.1) at a point in time (e.g., a full backup), changes to the state of the client (104, FIG. 1.1) over a period of time (e.g., an incremental backup), and/or other types of information reflecting the state and/or changes to the state of the client. The backup (122) may be usable, in isolation or in combination with other backups, to restore a state of the client (104, FIG. 1.1) to a previous state associated with the backup (122) and/or other backups.

For example, a backup that reflects the state of the client (104, FIG. 1.1) at a point in time may include a copy of all, or a portion, of the client's data at a point in time (e.g., a full backup). Such a backup may be implemented as, for example, an image of the client (or a portion of the client).

In another example, a backup that reflects changes to the state of the client (104, FIG. 1.1) over a period of time may include changes made to all, or a portion, of the client's data over the period of time. Such a backup may be implemented as, for example, a list of modifications to all of the client's data (e.g., an incremental backup) or a list of modifications to a particular portion of the client's data (e.g., a transaction log from an application hosted by the client). Backups that reflect changes to the state of the client over a period of time may be used in combination with at least one other backup that reflects the state of the client at a point in time (e.g., the state of the client at a point in time in combination with changes to the state of the client over a period of time may be used to derive the state of the client at a second point in time). Multiple backups that reflect changes to the state of the client over multiple periods of time may be used in combination (e.g., chaining) to derive the state of the client at any number of different points in time.

The backup (122) may have an organizational structure that reflects the organizational structure utilized by the client to organize its data. Consequently, the backup (122) may include organization data (e.g., allocation tables) that specifies the logical arrangement of client data and/or system metadata within the backup. The backup (122) may also include data and metadata that describe characteristics (e.g., sensitivity levels) of different portions of the data.

The backup index (124) may be a data structure that includes information regarding the client's data included in the backup (122). The information may include where different portions of the client's data are disposed within the backup (122), sensitivity levels for different portions of the client's data included in the backup, and/or information regarding the content of each of the different portions of the client's data included in the backup (122).

For example, the backup index (124) may specify locations (e.g., offsets, lengths, etc.) of logical portions (e.g., files) of the client's data within the backup (122). The backup index (124) may also specify information (e.g., name, creation date, type, description of the contents, sensitivity level, etc.) regarding the content of each of the logical portions of the client's data included in the backup (122).

The backup index (124) may be used to enable the contents of the backup to be stored in a manner that reduces the likelihood of inadvertent disclosure of information. To do so, the backup index (124) may be used to arrange various portions of the client data in one or more containers. The arrangement of the various portions of the client data in the one or more containers may reduce the likelihood of inadvertent disclosure of sensitive information. For additional details regarding containers and arrangement of data from backups in containers, refer to FIG. 1.4.

In one or more embodiments of the invention, the backup index (124) is generated without crawling (e.g., reading the client's data included in the backup (122) and deriving information based on the read client's data of the backup (122)) the backup (122). Rather, the backup index (124) may be generated based on (i) organization information included in the backup (122) and/or (ii) system metadata (e.g., metadata obtained from the backup that reflect metadata used by the client to organize its data). By doing so, the backup index (124) may be generated without expending computing resources on analyzing the contents of the backup (122) to generate information regarding the various portions of the backup (122). For example, the preexisting system metadata included in the backup (122) that already includes information regarding the various portions of the backup may be utilized to generate the backup index.

While the example client storage (120) has been illustrated as including data structures including a limited amount of specific information, any of the data structures stored in the example client storage (120) may include addition, less, and/or different information without departing from the embodiments of the invention. Further, the aforementioned data structures may be combined, subdivided into any number of data structures, may be stored in other locations (e.g., in a storage hosted by another device), and/or spanned across any number devices without departing from embodiments of the invention. Any of the aforementioned data structures may be implemented using, for example, lists, tables, linked lists, databases, and/or other types of data structures.

As discussed above, backups and backup indexes may be stored in backup storages in containers. A diagram of an example backup storage (130) in accordance with one or more embodiments of the invention is illustrated in FIG. 1.3.

In one or more embodiments of the invention, the example backup storage (130) is implemented using devices that provide data storage services (e.g., storing data and providing copies of previously stored data). The devices that provide data storage services may include hardware devices and/or logical devices. For example, the example backup storage (130) may include any quantity and/or combination of memory devices (i.e., volatile storage), long term storage devices (i.e., persistent storage), other types of hardware devices that may provide short term and/or long-term data storage services, and/or logical storage devices (e.g., virtual persistent storage/virtual volatile storage).

For example, the example backup storage (130) may include a memory device (e.g., a dual in line memory device) in which data is stored and from which copies of previously stored data are provided. In another example, the example backup storage (130) may include a persistent storage device (e.g., a solid state disk drive) in which data is stored and from which copies of previously stored data is provided. In a still further example, the example backup storage (130) may include a memory device (e.g., a dual in line memory device) in which data is stored and from which copies of previously stored data is provided and a persistent storage device that stores a copy of the data stored in the memory device (e.g., to provide a copy of the data in the event that power loss or other issues with the memory device that may impact its ability to maintain the copy of the data cause the memory device to lose the data).

The example backup storage (130) may store data structures including containers (132) and access restrictions (134). Each of these data structures is discussed below.

A container may be a data structure that stores data in a bulk format. In other words, containers may not natively include metadata or other types of data that describe the contents of the container. By doing so, more data may be stored within the storage resources assigned to the container when compared to scenarios in which other types of data structures for storing data (e.g., file systems) store metadata along with data.

The containers (132) stored in the backup storage may store copies of data from backups of the client (104, FIG. 1.1) and/or other entities. To reduce the likelihood of inadvertent disclosure of sensitive information, portions of the backup may be stored in the containers (132) in a manner that groups portions of the backup that have similar sensitivity levels. The portions may be grouped by storing them within predefined portions (e.g., regions) of the containers (132). For additional details regarding grouping portions of backups and storing the groupings in regions of the containers (132), refer to FIG. 1.4.

The example backup storage (130) may store any number of containers (132) without departing from the invention.

The access restrictions (134) may be a data structure that includes information regarding limitations on the ability of data included in different regions of the containers (132) from being accessed. As discussed above, data stored in the containers (132) may be grouped according to sensitivity level and stored in corresponding regions of the containers (132). The access restrictions (134) may specify one or more requirements for access data included in one or more regions of the containers (132). Thus, the example backup storage (130) may implement an access control scheme based on the storage locations of data stored within the containers (132) (rather than being based on the contents of the data). By doing so, access restrictions applicable to each portion of data stored in the containers (132) may be readily and computationally efficiently identified.

In one or more embodiments of the invention, the access restrictions (134) are implemented as a table. Each row of the table may correspond to one or more regions of one or more of the containers (132). For example, each row may specify identifiers of corresponding regions of the containers (132).

Each of the rows may also specify access restrictions for the data stored in the corresponding regions of the containers (132). For example, each row may specify identities of entities that are authorized to access the data stored in the corresponding regions or other types of information that may be used to limit access to the data stored in the corresponding regions of the containers (132). Different rows may specify different types of access restrictions.

For example, a first row may specify access restrictions for a first region of a first container that includes highly sensitive information. The access restriction may require that a user identity, domain, and other identifying information of a user requesting access to corresponding data be verified before providing access to the corresponding data included in the first region. In contrast, a second row may specify access restrictions for a second region of the first container that includes insensitive information. The access restriction may specify that any entity may access the corresponding data in the second region of the first container without any verification being performed.

While the example backup storage (130) has been illustrated as including data structures including a limited amount of specific information, any of the data structures stored in the example backup storage (130) may include addition, less, and/or different information without departing from the embodiments of the invention. Further, the aforementioned data structures may be combined, subdivided into any number of data structures, may be stored in other locations (e.g., in a storage hosted by another device), and/or spanned across any number devices without departing from embodiments of the invention. Any of the aforementioned data structures may be implemented using, for example, lists, tables, linked lists, databases, and/or other types of data structures.

As discussed with respect to FIG. 1.3, containers may be stored in backup storage. FIG. 1.4 shows a diagram of an example container (140) in accordance with one or more embodiments of the invention. The example container (140) may store data from one or more backups of entities.

To store data, the example container (140) may include metadata (142) that describes data included in any number of regions (144) of the example container (140). A region (e.g., 146, 148) may be a portion of the storage resources allocated to the example container (140).

Each of the regions (e.g., 146, 148) may correspond with different sensitivity levels. In other words, the data included in each of the regions may have a similar level of sensitivity. Each of the regions (144) may store portions of backups having similar levels of sensitivity.

The metadata (142) may describe the portions of data stored in each of the regions and/or the regions (144). For example, the metadata (142) may specify where each portion of the data stored in each of the regions starts/stops (e.g., offsets from the beginning of the regions (144) to a start/stop of respective portions of stored data). Similarly, the metadata (142) may specify where each of the regions (e.g., 146, 148) starts/stops. The metadata (142) may also specify a sensitivity level associated with each of the regions (144).

Thus, the metadata (142) may enable the sensitivity of data stored in each of the regions to be identified and/or enable each of the portions of data stored in the regions (144) to be read from the example container (140).

While the example container (140) has been illustrated as including data structures including a limited amount of specific information, any of the data structures stored in the example container (140) may include addition, less, and/or different information without departing from the embodiments of the invention. Further, the aforementioned data structures may be combined, subdivided into any number of data structures, may be stored in other locations (e.g., in a storage hosted by another device), and/or spanned across any number devices without departing from embodiments of the invention. Any of the aforementioned data structures may be implemented using, for example, lists, tables, linked lists, databases, and/or other types of data structures.

As discussed above, the system of FIG. 1.1 may store backups in containers when providing backup services. FIGS. 2-3 show methods that may be performed by components of the system of FIG. 1.1 to provide backup services.

FIG. 2 shows a flowchart of a method in accordance with one or more embodiments of the invention. The method depicted in FIG. 2 may be used to provide backup generation services in accordance with one or more embodiments of the invention. The method shown in FIG. 2 may be performed by, for example, a backup manager (e.g., 100, FIG. 1.1). Other components of the system in FIG. 1.1 may perform all, or a portion, of the method of FIG. 2 without departing from the invention.

While FIG. 2 is illustrated as a series of steps, any of the steps may be omitted, performed in a different order, additional steps may be included, and/or any or all of the steps may be performed in a parallel and/or partially overlapping manner without departing from the invention.

In step 200, a backup for a client is generated.

In one or more embodiments of the invention, the backup is generated by sending a message to an agent hosted by the client. In response to receiving the message, the agent hosted by the client may (i) generate the backup and/or (ii) invoke backup generation functionality of another entity hosted by the client to generate the backup. For example, applications hosted by the client may include native backup generation functionality that may be invoked to generate a backup.

In step 202, an index for the backup is generated. The generated index may specify where different portions of the backup start/stop and the sensitivity level of each of the portions of the backup. The index may specify additional and/or different information (e.g., metadata) regarding each portion of the backup without departing from the invention.

The index may be generated by, for example, (i) crawling the backup and characterizing each portion of the backup based on the crawling, (ii) obtaining system metadata from the client (e.g., by sending requests to an operating system hosted by the client) and using the system metadata to generate the index based on a similar data organization scheme employed by both the client and the generated backup, and/or (iii) obtaining system metadata from the backup (e.g., reading system metadata from the backup) or a previously generated backup and using the system metadata to generate the index.

The index may be generated by generating a new data structure or adding data to an existing data structure. The index may also include corresponding access information (e.g., offsets, lengths, etc.) for each of the portions of the client's data stored in the generated backup. The index may include any type and quantity of information regarding the copy of the client data stored in the backup that corresponds to information based on the system metadata. For example, the index (e.g., backup index) may specify the name of each portion of client data, information regarding each portion of client data such as sensitivity level, etc.

The index may be implemented as, for example, a table. The index may be implemented as different types of data structures (e.g., lists, linked lists, database entries, etc.) without departing from the invention.

In one or more embodiments of the invention, the sensitivity level of each of the portion of the backups is determined indirectly. For example, the system metadata may not specify a sensitivity level of each portion of the backup. To identify the sensitivity level, portions of the system metadata may be matched to different categories having different sensitivity levels. For example, system metadata that indicates personal information is included in a portion of the backup may be matched to a category having a high sensitivity level. In contrast, system metadata that indicates impersonal information is included in a portion of the backup may be matched to a category having a low sensitivity level.

In one or more embodiments of the invention, the sensitivity level of each of the portion of the backups is determined based on the contents of each portion of the backup. For example, the contents of each portion of the backup may be data mined to identify whether its content includes sensitive information such as, for example, personal information, payment information, or other types of information that may be detrimental if generally distributed.

The identified sensitivity level of each portion of the backup may be added to the index and associated with the corresponding portion of the backup.

In step 204, portions of the backup are stored in regions of a container based on the sensitivity level of each of the portions using the index.

In one or more embodiments of the invention, the backup is stored by dividing the backup into chunks. Each of the chunks may correspond to a sub-portion of a portion of the backup. For example, the chunks may be data structure of approximately equal size.

The chunks may be deduplicated against data stored in backup storage. Deduplication may mean to discard chunks, for storage purposes, that are duplicative of existing chunks stored in the backup storage.

The deduplicated chunks may be grouped based on sensitivity level of a portion of the backup corresponding to each respective chunk. In other words, groups of chunks having the same/similar sensitivity level may be formed.

The groups of chunks may be stored in regions of a container having a sensitivity level corresponding to the sensitivity of each of the groups of chunks. In other words, the grouped chunks may be stored in regions with other chunks from other backups having similar sensitivity levels. By doing so, each of the portions of the backup may be stored in respective regions of the container based on the sensitivity level of each of the portions of the backup.

The metadata of the container may be updated to reflect the addition of the chunks to the regions of the container. For example, offsets to the start/end of each chunk may be added to the metadata. Other types of information may be added to the metadata regarding the chunks without departing from the invention.

In step 206, the container is stored in backup storage.

The method may end following step 206.

Throughout the method illustrated in FIG. 2, the backup manager (100, FIG. 1.1) may send messages to the agent (106, FIG. 1.1) to cause the method illustrated in FIG. 2 to be performed. The backup manager (100, FIG. 1.1) may cause the backup to be generated based on protection policies or other information that specifies when backups for entities should be generated to meet data integrity requirements.

By generating the backup and storing it in a container as illustrated in FIG. 2, the data stored in the backup storage may facilitate implementation of access controls. Specifically, by storing data having different levels of sensitivity in particular locations (e.g., regions of containers), access controls applying to each portion of data (e.g., data chunks) may be easily identified and/or implemented.

For example, to control access to more sensitive data, the backup storage may automatically apply encryption to regions of containers having highly sensitive data. Progressively less sophisticated and/or computationally expensive forms of encryption may be applied to different containers based on the relative sensitivity level of each container.

By aggregating data having similar levels of sensitivity together, access control schemes may be more easily and/or computationally efficiently applied. For example, by storing data of similar levels of sensitivity contiguously and applying the same encryption technique, continuous binary sequence encryption methods may be employed rather than algorithms for encryption that may be applied to data that is not stored contiguously in storage.

As discussed above, access to data stored in backup storage may be requested by any number of entities. FIG. 3 shows a flowchart of a method in accordance with one or more embodiments of the invention. The method depicted in FIG. 3 may be used to provide access to data in backup storage as part of providing backup services in accordance with one or more embodiments of the invention. The method shown in FIG. 3 may be performed by, for example, a backup manager or a backup storage (e.g., 100, 110, FIG. 1.1). Other components of the system in FIG. 1.1 may perform all, or a portion, of the method of FIG. 3 without departing from the invention.

While FIG. 3 is illustrated as a series of steps, any of the steps may be omitted, performed in a different order, additional steps may be included, and/or any or all of the steps may be performed in a parallel and/or partially overlapping manner without departing from the invention.

In step 300, a request for data stored in backup storage is obtained from any entity. The request may be obtained via a message or other type of communication. The data may be a portion of a backup.

In step 302, data chunks associated with the data are identified. The data chunks may be identified based on an identifier of the requested data. For example, any number of data chunks may be associated with an identifier of a data structure that may be requested. As discussed above, data may be chunked prior to storage in containers. Consequently, a requested data structure may be reconstructed by obtaining the chunks corresponding to the requested data structure.

In Step 304, an unchecked chunk of the identified chunks is selected. At the end of step 302, all of the identified chunks may be considered to be unchecked. As will be discussed below, a chunk may be considered to be checked after it is determined whether all access controls applying to the selected unchecked data chunk has been evaluated.

In step 306, it is determined whether a region in which the selected unchecked data chunk is stored indicates an access control restriction. As discussed above, the access control restrictions may apply on a per region basis. Consequently, the regions to which each of the access control restrictions apply may be evaluated to determine whether the region in which the selected unchecked data chunk is stored indicates whether an access control restriction applies.

If an access control restriction applies, the method may proceed to step 308. If no access control restrictions apply, the method may proceed to step 310.

In step 308, it is determined whether the entity that requested the data meets the access restriction. As discussed above, access restrictions may specify characteristics of entities that may either be (i) subject to access restriction or (ii) not subject to access restriction. For example, an access restriction may specify a location where an entity must reside for the entity not to be subject to an access restriction. The access restriction may specify other characteristics (e.g., names, identifiers of devices, domains, etc.) of entities to discriminate between entities that are subject to access restrictions and entities that are not subject to access restrictions.

If it is determined that the entity meets the access restriction (i.e., is not subject to access restrictions), the method may proceed to step 310. In other words, the method may proceed to step 310 if the access restriction indicates that the entity should be allowed access to the data chunk. If it is determined that the entity does not meet the access restriction (i.e., is subject to access restrictions), the method may end following step 308. In other words, the entity may not be provided access to the data following step 308 if the entity does not meet the access restriction.

Returning to step 306, the method may proceed to step 310 following step 306.

In step 310, it is determined whether all of the data chunks are checked (e.g., have been evaluated via steps 306 and/or 308). If all of the data chunks have been checked, the method may proceed to step 312. If all of the data chunks have not been checked, the method may return to step 304 resulting in a different data chunk being selected for checking for access restriction purposes via steps 306 and/or 308.

In step 312, the data is provided to the entity using the data chunks. The data may be provided by reconstructing the data using the data chunks and providing a copy of the reconstructed data (i.e., de-chunked data) to the entity.

In one or more embodiments of the invention, one or more of the data chunks are decrypted prior to reconstructing the data. For example, data chunks stored in regions associated with high sensitivity levels may be encrypted when stored in containers.

The method may end following step 312.

Thus, via the method illustrated in FIG. 3, data that is subject to access restrictions may be obtained from containers that enable the corresponding access restrictions to be efficiently identified. For example, the identity of a region in which a data chunk is stored may be utilized to identify the corresponding access restrictions to which the data chunk is subject.

To further clarify embodiments of the invention, a non-limiting example is provided in FIGS. 4.1-4.3. FIG. 4.1 may illustrate a system similar to that illustrated in FIG. 1.1. FIGS. 4.2-4.3 may illustrate interactions between components and/or actions performed by the components of the system of FIG. 4.1 over time. For the sake of brevity, only a limited number of components of the system of FIG. 1.1 are illustrated in each of FIGS. 4.1-4.3.

EXAMPLE

Consider a scenario as illustrated in FIG. 4.1 in which a backup manager (400) is providing backup services to a first client (402). When providing backup services, the backup manager (400) may orchestrate storage of backups of the first client (402) in a backup storage (404). Over time, a second client (406) may desire access to the data included in the backup storage (404).

Turning to FIGS. 4.2-4.3, the aforementioned figures illustrate interactions and actions between components of the system of FIG. 4.1. In these figures, the relative occurrence in time of the interactions progresses from the top of each figure (i.e., earlier in time) to the bottom of each figure (i.e., later in time). FIG. 4.3 is a continuation of the diagram of FIG. 4.2. In other words, element 410 indicates the first interaction that occurs in time while element 434 indicates the last interaction that occurs.

Turning to FIG. 4.2, at a first point in time, the backup manager (400) initiates a backup generation (410) for the first client (402). The backup manager (400) may initiate the backup generation (410) to meet a data protection policy requirement. The backup manager (400) may initiate a backup generation (410) by sending a message to an agent hosted by the first client (402).

In response to initiation of the backup generation (410), the agent generates a backup (412). The generated backup may be any type of backup. For example, the backup may be an image of the first client (402).

After generating the backup (412), an index for the backup (414) is generated using system metadata of the first client (402). After generating the index, the backup is chunked (416) to obtain data chunks.

The data chunks are stored in regions of a container based on the sensitivity of each of the chunks (418). For example, the data chunks may be grouped based on their respective sensitivities specified by the index. The container including the regions (420) that include data chunks of similar sensitivity are stored in the backup storage (404).

Turning to FIG. 4.3, after the container is stored in backup storage (404), the second client (406) sends a first client data request (422) to the backup manager (400). The first client data request (422) requests a portion of the backup of the first client (402) stored in the backup storage (404).

In response to receiving the request, the backup manager (400) sends a first client data request (424) to the backup storage (404). Additionally, the backup manager (400) notifies the backup storage (404) of the second client identity (426). In other words, provides the identity of the requesting entity to the backup storage (404).

In response to receiving the request and notification from the backup manager (400), the backup storage (404) identifies regions storing the first client data (428) of the previously stored container. Based on the identified regions of the container, the backup storage (404) identifies access restrictions for the identified regions (430).

Once identified, the second client identity (426) is compared to the access restrictions (432). In this example, the comparison indicates that the second client (406) is subject to the access restrictions and, consequently, may not be provided access to the first client data stored in the backup storage (404).

In response to determining that the second client (406) is subject to access restrictions, the backup storage (404) notifies the backup manager (400) that the second client data is access denied (434).

After being notified of being access denied (434), the backup manager (400) notifies the second client (406) of being access denied (436). Consequently, the second client (406) is unable to access the requested first client data.

End of Example

Thus, as illustrated in FIGS. 4.1-4.3, embodiments of the invention may provide a method for storing backups in backup storage in a manner that facilitates controlling access to different portions of the stored data while still storing the data of the backups in a computationally efficient manner (e.g., without metadata similar to that employed by file systems or other highly granular systems). By doing so, access controls for data in backup storages may be efficiently deployed.

Figure 5:
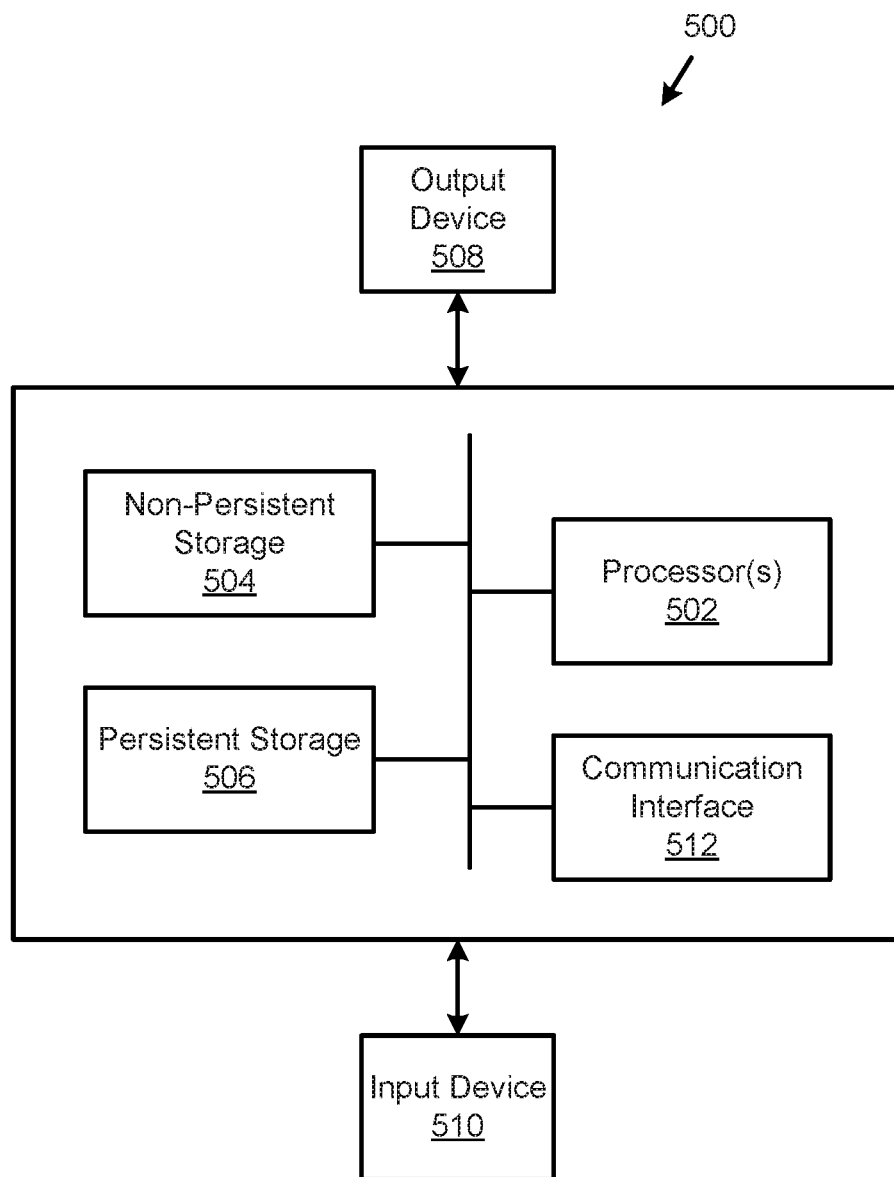
FIG. 5 shows a diagram of a computing device in accordance with one or more embodiments of the invention.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments of the invention may provide a method for providing backup services. To do so, embodiments of the invention may provide a system that stores data in a specific manner that enables access controls to be employed while avoiding the computing resource cost of granular metadata. To do so, embodiments of the invention may group different portions of data based on the respective sensitivity level of each of the portions of the data. Access controls applying to all of the data in each group may be employed to provide access control on a per group level. By doing so, access controls for stored data may be utilized without requiring metadata for each portion of data to be stored that defines the access controls for the respective portions.

Thus, embodiments of the invention may address the problem of limited computational resource availability for providing backup services in a distributed environment.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A backup manager for providing backup services, comprising:
   persistent storage for storing protection policies; and
   a backup orchestrator programmed to:
     generate a backup for a client based on the protection policies;
     generate an index for the backup, wherein the index specifies a sensitivity level of each portion of the backup, and wherein generating the index for the backup comprises:
       obtaining system metadata from the client;
       identifying a sensitivity level for each portion of the backup using the system metadata; and
       associating the sensitivity level for each portion of the backup with the portion of the backup;
     store portions of the backup in regions of a container that correspond to the sensitivity level of the respective portion of the backup, wherein storing the portions of the backup in the regions of the container that correspond to the sensitivity level of the respective portion of the backup comprises:
       grouping the portions of the backup based on sensitivity level;
       chunking each of the portions of the backup into respective data chunk groups;
       deduplicating data chunks of the data chunk groups against data stored in a backup storage to obtain deduplicated data chunk groups;
       storing all of the portions of the backup in each of the groupings in corresponding regions of the container;
       storing each of the data chunks of the deduplicated data chunk groups in the regions of the container; and
       storing offsets to a start and end of each of the data chunks of the data chunk groups in the regions; and
     store the container in the backup storage.

2. The backup manager of claim 1, wherein the backup orchestrator is further programmed to:
   obtain a request for a portion of the backup;
   identify a region of the regions of the container in which the backup is stored;
   make a determination that a requesting entity is not authorized to obtain the portion of the backup based on:
     an identity of the requesting entity, and
     an access restriction associated with the region of the regions; and
   deny access to the portion of the backup to the requesting entity.

3. The backup manager of claim 1, wherein the container comprises:
   the regions; and
   metadata that specifies offsets to a start and an end of each of the regions.

4. The backup manager of claim 1, wherein storing the container in the backup storage comprises:
   encrypting at least one of the regions of the container based on a sensitivity level associated with the at least one of the regions.

5. A method for providing backup services, comprising:
   generating a backup for a client based on a protection policy associated with the client;
   generating an index for the backup, wherein the index specifies a sensitivity level of each portion of the backup, and wherein generating the index for the backup comprises:
     obtaining system metadata from the client;
     identifying a sensitivity level for each portion of the backup using the system metadata; and
     associating the sensitivity level for each portion of the backup with the portion of the backup;
   storing portions of the backup in regions of a container that correspond to the sensitivity level of the respective portion of the backup, wherein storing the portions of the backup in the regions of the container that correspond to the sensitivity level of the respective portion of the backup comprises:
     grouping the portions of the backup based on sensitivity level;
     chunking each of the portions of the backup into respective data chunk groups;
     deduplicating data chunks of the data chunk groups against data stored in a backup storage to obtain deduplicated data chunk groups;
     storing all of the portions of the backup in each of the groupings in corresponding regions of the container;

storing each of the data chunks of the deduplicated data chunk groups in the regions of the container; and storing offsets to a start and end of each of the data chunks of the data chunk groups in the regions; and storing the container in the backup storage.

6. The method of claim 5, further comprising:

obtaining a request for a portion of the backup;

identifying a region of the regions of the container in which the backup is stored;

making a determination that a requesting entity is not authorized to obtain the portion of the backup based on:

an identity of the requesting entity, and an access restriction associated with the region of the regions; and denying access to the portion of the backup to the requesting entity.

7. The method of claim 5, wherein the container comprises:

the regions; and metadata that specifies offsets to a start and an end of each of the regions.

8. The method of claim 5, wherein storing the container in the backup storage comprises:

encrypting at least one of the regions of the container based on a sensitivity level associated with the at least one of the regions.

9. A non-transitory computer readable medium comprising computer readable program code, which when executed by a computer processor enables the computer processor to perform a method for providing backup services, the method comprising:

generating a backup for a client based on a protection policy associated with the client;

generating an index for the backup, wherein the index specifies a sensitivity level of each portion of the backup, and wherein generating the index for the backup comprises:

obtaining system metadata from the client, identifying a sensitivity level for each portion of the backup using the system metadata; and associating the sensitivity level for each portion of the backup with the portion of the backup;

storing portions of the backup in regions of a container that correspond to the sensitivity level of the respective portion of the backup, wherein storing the portions of the backup in the regions of the container that correspond to the sensitivity level of the respective portion of the backup comprises:

grouping the portions of the backup based on sensitivity level;

chunking each of the portions of the backup into respective data chunk groups;

deduplicating data chunks of the data chunk groups against data stored in a backup storage to obtain deduplicated data chunk groups;

storing all of the portions of the backup in each of the groupings in corresponding regions of the container;

storing each of the data chunks of the deduplicated data chunk groups in the regions of the container; and storing offsets to a start and end of each of the data chunks of the data chunk groups in the regions; and storing the container in the backup storage.

10. The non-transitory computer readable medium of claim 9, wherein the method further comprises:

obtaining a request for a portion of the backup;

identifying a region of the regions of the container in which the backup is stored;

making a determination that a requesting entity is not authorized to obtain the portion of the backup based on:

an identity of the requesting entity, and an access restriction associated with the region of the regions; and denying access to the portion of the backup to the requesting entity.

11. The non-transitory computer readable medium of claim 9, wherein the container comprises:

the regions; and metadata that specifies offsets to a start and an end of each of the regions.

* * * * *